F. Wagner.
Vegetable Cutter.
N° 106,620.   Patented Aug. 16, 1870.
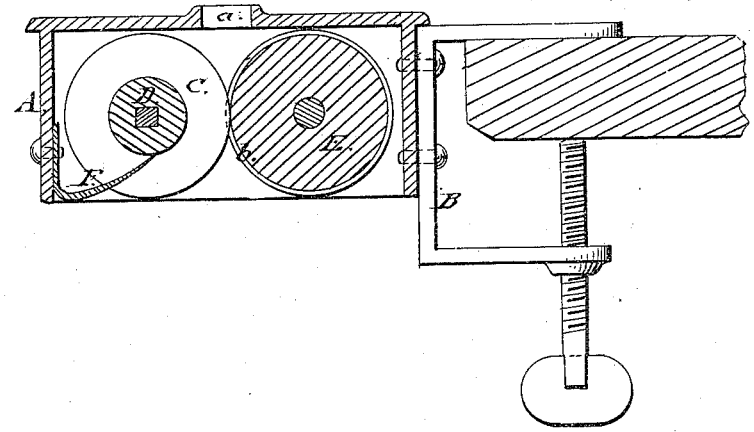
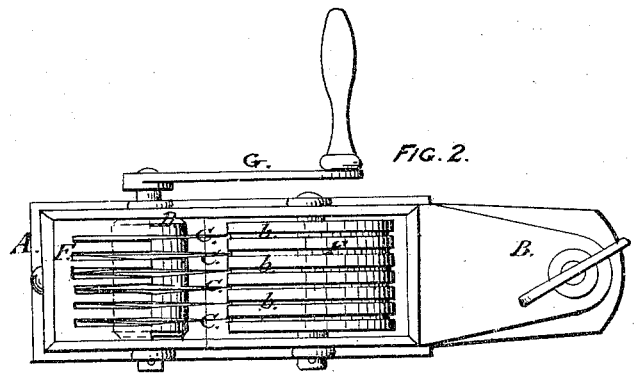
WITNESSES:
E. F. Kastenhuber
Rob. Heim Gross
INVENTOR:
Franz Wagner
Per
Van Santvoord & Hauff
attorneys

United States Patent Office.

FRANZ WAGNER, OF NEW YORK, N. Y.

Letters Patent No. 106,520, dated August 16, 1870.

IMPROVED VEGETABLE-CUTTER.

The Schedule referred to in these Letters Patent and making part of the same.

*To all whom it may concern:*

Be it known that I, FRANZ WAGNER, of New York, in the county and State of New York, have invented a new and improved Vegetable Cutter; and I do hereby declare the following to be a full, clear, and exact description thereof, which will enable those skilled in the art to make and use the same, reference being had to the accompanying drawing forming part of this specification, in which drawing—

Figure 1 represents a longitudinal vertical section of this invention.

Figure 2 is an inverted plan thereof.

Similar letters indicate corresponding parts.

This invention relates to a vegetable-cutter which is intended more particularly for slicing beans, but which may be used for cutting vegetables of a different nature.

It consists of a series of disk-knives, secured to a shaft to which a revolving motion can be imparted, the cutting-edges of the knives being made to project into circular grooves on a cylinder which has its bearings in the frame which supports the knife-carrier, said knife-carrier being arranged in combination with the grooved cylinder and with a stripper and feed-opening in the frame, in such a manner that, when a revolving motion is imparted to the knife-carrier, and beans or other vegetables are fed in through the feed-opening, the operation of slicing said vegetables can be effected with great dispatch.

A represents a frame or box, which is open at the bottom, and provided with a feed-opening, $a$, in its top, and with a bracket, B, on one of its ends, so that it can be conveniently secured to a table, as indicated in fig. 1 of the drawing.

The sides of the frame A form the bearings for the knife-carrier D, and for the grooved or notched cylinder E.

On the knife-carrier is secured a series of disk-knives, C, the cutting edges of which extend into the grooves $b$ of cylinder E, as shown in the drawing, and on one end of the knife-carrier is mounted a crank, G, which serves to impart to the same a revolving motion.

The point of contact between the knives and the cylinder E is below the feed-opening in the frame A.

The knives C are placed at suitable distances apart, according to the desired width of the slices to be produced, and they work through the stripper F, which is attached to the outer end of the frame A, as clearly shown in the drawing.

By the action of the stripper the knives are kept clean, and the sliced beans, or other vegetables, being prevented from getting between the knives are compelled to drop down into a dish or other vessel placed under the frame A.

In slicing beans, or other vegetables, one bean after the other is fed through the opening $a$, and divided into a number of slices of the required width.

Having thus described my invention,

What I claim as new, and desire to secure by Letters Patent, is—

The combination of a single grooved cylinder, E, the series of knives C, mounted on the rotating shaft D, and the stripper F, secured to the sides of the frame, and all constructed and adapted to operate together as herein represented and described.

FRANZ WAGNER.

Witnesses:
W. HAUFF,
E. F. KASTENHUBER.